United States Patent Office 3,652,694
Patented Mar. 28, 1972

---

3,652,694
PREPARATION OF SUBSTITUTED AROMATIC COMPOUNDS
George R. Lester, Park Ridge, Ill., assignor to Universal Oil Products Company, Des Plaines, Ill.
No Drawing. Filed Mar. 18, 1970, Ser. No. 20,809
Int. Cl. C07c *15/02*
U.S. Cl. 260—668 A                                    9 Claims

---

ABSTRACT OF THE DISCLOSURE

Substituted aromatic compounds containing the same number of carbon atoms as the starting material are prepared in a two-step process by subjecting a geminally substituted cycloalkane to isomerization in the presence of a gold-containing catalyst at a temperature in the range of from about 250° to about 400° C. and thereafter aromatizing the resultant non-geminally substituted cycloalkane at an elevated temperature and pressure in the presence of certain catalysts to prepare the desired product. The process is exemplified by the conversion of 1,1-dimethylcyclohexane to ethylbenzene and o-xylene.

---

This invention relates to a process for the conversion of geminally substituted cycloalkanes to substituted aromatic compounds. More specifically, the invention is concerned with a two-step process for converting geminally substituted cycloalkanes to substituted aromatic compounds containing the same number of carbon atoms as the starting material which are relatively more important for various chemical uses than are the precursor compounds.

The substituted aromatic compounds which are prepared according to the process of this invention comprise articles of commerce which, as hereinbefore set forth, occupy a more vital part of chemical processes than do the geminally substituted cycloalkanes. For example, ethylbenzene and o-xylene which may be obtained by the conversion of 1,1-dimethylcyclohexane are useful chemical compounds. Ethylbenzene is useful in organic synthesis; as a solvent and diluent, and more importantly, is used as an intermediate in the production of styrene, the latter compound being known as a component in the preparation of synthetic rubber. In addition, polystyrene is also useful as a foam, etc. In the usual production of xylenes the isomeric ortho-, meta, and para-xylenes are present as a mixture, the meta- and para-xylenes predominating in the commercial mixture. It is well known that the separation of the three isomers into pure fractions thereof is relatively difficult to accomplish due to the fact that the boiling points of these isomers fall within a relatively low range thus necessitating the use of expensive distillation or crystallization equipment to effect a clean-cut separation. Ortho-xylene which may be prepared according to the process of this invention is useful in vitamin and pharmaceutical synthesis; in the preparation of dyes, insecticides, etc. and also is an intermediate in the manufacture of phthalic anhydride. The latter compound is well known for its use in alkyd resins, polyesters, plasticizers or in the synthesis of phenolphthalein and other dyes, etc. Yet another compound which may be prepared according to the process of this invention comprises diethylbenzene which also may be used as an intermediate in the preparation of other chemical compounds or as a solvent.

It is therefore an object of this invention to provide a process for the conversion of geminally substituted cycloalkanes to more useful chemical compounds.

A further object of this invention is to provide a process for the conversion of geminally substituted cycloalkanes to aromatic compounds having the same number of carbon atoms.

In one aspect an embodiment of this invention resides in a process for the conversion of a geminally substituted cycloalkane which comprises isomerizing said cycloalkane at a temperature in the range of from about 250° to about 400° C. and a pressure in the range of from about atmospheric to about 1,000 pounds per square inch in the presence of a gold-containing catalyst, thereafter aromatizing the resultant non-geminally substituted cycloalkane at a temperature in the range of from about 400° to about 550° C. and a pressure in the range of from about atmospheric to about 2,000 pounds per square inch in the presence of an aromatization catalyst comprising a noble metal of Group VIII of the Periodic Table composited on a promoted solid support, and recovering the resultant substituted aromatic compound.

A specific embodiment of this invention is found in the process for the conversion of 1,1-dimethylcyclohexane which comprises isomerizing said compound at a temperature in the range of from about 250° to about 400° C. and at a pressure in the range of from about atmospheric to about 1,000 pounds per square inch in the presence of a catalyst comprising gold composited on alumina, thereafter aromatizing the resultant non-geminally substituted cycloalkanes at a temperature in the range of from about 400° to about 550° C. and a pressure in the range of from about atmospheric to about 2,000 pounds per square inch in the presence of a catalyst comprising platinum composited on lithiated alumina, and recovering the resultant ethylbenzene and o-xylene.

Other objects and embodiments will be found in the following further detailed description of the present invention.

As hereinbefore set forth the present invention is concerned with a two-step process for converting a geminally substituted cycloalkane to a substituted aromatic compound containing the same number of carbon atoms as the geminally substituted cycloalkane, said conversion being effected in a manner hereinafter set forth in greater detail. Geminally substituted cycloalkanes which may be converted to non-geminally substituted aromatic compounds will possess the generic formula:

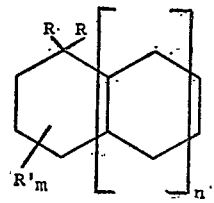

in which R is an alkyl radical of from 1 to 2 carbon atoms, R′ is a hydrogen, alkyl of from 1 to 10 carbon atoms, cycloalkyl, halo or alkoxy radical, n is 0 or 1 and m is an integer of from 1 to 10 when n is 0 and from 1 to 16 when n is 1, at least one carbon atom adjacent to the geminally substituted carbon atom containing a hydrogen atom. Some specific examples of these compounds will include 1,1-dimethylcyclohexane,
1,1-diethylcyclohexane,
1,1-dimethyldecahydronaphthalene,
1,1-diethyldecahydronaphthalene, 1,1,3-trimethylcyclohexane,
1,1,3,4-tetramethylcyclohexane,
1,1-dimethyl-3-ethylcyclohexane,
1,1-dimethyl-4-propylcyclohexane,
1,1-dimethyl-3,4-dibutylcyclohexane,
1,1-dimethyl-3-pentylcyclohexane,
1,1-dimethyl-3-cyclopentylcyclohexane,
1,1-dimethyl-3-chlorocyclohexane,
1,1-dimethyl-3,4-dichlorocyclohexane,
1,1-dimethyl-3-bromocyclohexane,
1,1-dimethyl-3,4-dibromocyclohexane,
1,1-dimethyl-3-methoxycyclohexane,
1,1-dimethyl-3-ethoxycyclohexane,
1,1-dimethyl-3,4-dimethoxycyclohexane,
1,1-diethyl-3-methylcyclohexane,
1,1,3-triethylcyclohexane,
1,1-diethyl-3-propylcyclohexane,
1,1-diethyl-4-propylcyclohexane,
1,1-diethyl-3,4-dibutylcyclohexane,
1,1-diethyl-3-pentylcyclohexane,
1,1-diethyl-3-cyclopentylcyclohexane,
1,1-diethyl-3-chlorocyclohexane,
1,1-diethyl-3,4-dichlorocyclohexane,
1,1-diethyl-3-bromocyclohexane,
1,1-diethyl-3,4-dibromocyclohexane,
1,1-diethyl-3-methoxycyclohexane,
1,1-diethyl-3-ethoxycyclohexane,
1,1-diethyl-3,4-dimethoxycyclohexane,
1,1,3,4-tetramethyldecahydronaphthalene,
1,1,3,4-tetramethydecahydronaphthalene,
1,1-dimethyl-3-propyldecahydronaphthalene,
1,1-dimethyl-3,4-dipropyldecahydronaphthalene,
1,1-dimethyl-3-butyldecahydronaphthalene,
1,1-dimethyl-3,4-t-butyldecahydronaphthalene,
1,1-dimethyl-3,4-dichlorodecahydronaphthalene,
1,1-dimethyl-3-chlorodecahydronaphthalene,
1,1-dimethyl-3,4-dichlorodecahydronaphthalene,
1,1-dimethyl-3-bromodecahydronaphthalene,
1,1-dimethyl-3,4,5-tribromodecahydronaphthalene,
1,1-dimethyl-3-methoxydecahydronaphthalene,
1,1-dimethyl-3,4-dimethoxydecahydronaphthalene,
1,1-dimethyl-3-ethoxydecahydronaphthalene,
1,1-dimethyl-4-propoxydecahydronaphthalene,
1,1-diethyldecahydronaphthalene,
1,1,3-triethyldecahydronaphthalene,
1,1,3,4-tetraethyldecahydronaphthalene,
1,1-diethyl-3-propyldecahydronaphthalene,
1,1-diethyl-3,8-dipropyldecahydronaphthalene,
1,1-diethyl-3,4,5-tributyldecahydronaphthalene,
1,1-diethyl-4,5-dicyclopentyldecahydronaphthalene,
1,1-diethyl-3-chlorodecahydronaphthalene,
1,1-diethyl-3,4-dichlorodecahydronaphthalene,
1,1-diethyl-3,4,5,8-tetrachlorodecahydronaphthalene,
1,1-diethyl-3-bromodecahydronaphthalene,
1,1-diethyl-3,4-dibromodecahydronaphthalene,
1,1-diethyl-3,4,5,8-tetrabromodecahydronaphthalene,
1,1-diethyl-3,4-dimethoxydecahydronaphthalene,
1,1-diethyl-3,4,8-triethoxydecahydronaphthalene, etc.

It is to be understood that the aforementioned geminally substituted cycloalkanes are only representative of the class of compounds which may be converted, and that the present invention is not necessarily limited thereto.

The conversion of the aforementioned geminally substituted cycloalkanes is effected in a two-step process. The first step of the process in which the geminally substituted cycloalkanes are isomerized to non-geminally substituted cycloalkanes is effected at elevated temperatures, said temperatures being in a range of from about 250° C. to about 400° C. In addition, the pressure at which the isomerization is effected will range from atmospheric up to about 1,000 pounds per square inch or more. Generally speaking, superatmospheric pressures are preferred and particularly, that a partial pressure which is afforded by the introduction of hydrogen to prevent the carbonization of the catalyst thereby extending the life of the same, may be used. When using these superatmospheric pressures the remainder of the desired operating pressure in addition to the hydrogen will be made up by the introduction of other gases such as nitrogen, carbon dioxide or helium whereby the desired operating pressure may be attained and maintained during the residence time of the reaction, said residence time being in a range of from about 0.5 up to about 10 hours or more in duration.

The aforementioned isomerization reaction is effected in the presence of a catalyst containing gold. Generally speaking, the catalytic composition of matter comprises an auric compound deposited on a solid support in an amount so that the concentration of the gold will range from about 0.05 up to about 5% by weight of the finished catalyst. The catalyst is prepared by compositing a soluble auric salt such as auric chloride, auric bromide, auric cyanide, auric sulphate, etc. on a solid support which, in the preferred embodiment of the process, comprises a metal oxide. Examples of these metal oxides which may be used as catalyst supports for the gold compound will include alumina in its various forms such as α-alumina, γ-alumina, η-alumina, θ-alumina, silica, magnesia, zirconia, thoria, etc. or mixtures thereof including silica-alumina, silica-zirconia, alumina-silica-zirconia, alumina-silica-magnesia, etc. The preparation of the catalyst whereby the gold-containing compound is composited on the solid support may be effected in any manner known in the art, one such manner comprising forming an aqueous solution of the gold salt, admixing the solid support therewith and thereafter drying and calcining said support. In addition, it is also contemplated within the scope of this invention, that the catalytic composition of matter may, if so desired, also contain a relatively small amount, that is, less than 10% of the finished catalytic composite of an alkali metal or an alkali earth metal. These alkali metals such as sodium, potassium, lithium, rubidium, cesium, calcium, strontium, barium, etc. may also be admixed with the catalytic composite in the form of an aqueous solution and thereafter dried and calcined in the usual manner.

The aromatization of the non-geminally substituted cycloakane is effected in the presence of certain catalytic compositions of matter comprising a noble metal of Group VIII composited on a promoted metal oxide support. The finished catalytic composite may contain from about 0.05% to about 5% by weight of the Group VIII noble metal. The noble metals which may be used include platinum, palladium, iridium, ruthenium, rhodium and osmium. The desired catalyst which is used in the present process may be prepared in any suitable manner and it is understood that the particular method chosen may be any which is well known in the art. Generally speaking, the solid metal oxide support and, in the preferred embodiment of the present process, an alumina carrier metal such as γ-alumina may be prepared and formed into the desired shape and size. The alkali metal or, if so desired, the alkaline earth metal including sodium, potassium, rubidium, cesium and especially lithium or barium, strontium, calcium, etc., is added as an aqueous solution thereof. This aqueous solution may be formed by dissolving a water soluble salt such as the chlorides, sulphates, nitrates or acetates of the alkali metal or alkaline earth metal and adding it to the solid support. The alkali metals will be utilized in an amount not generally exceeding 5.0% by weight; in order to achieve a proper balance between inhibiting the occurrence of side reactions and imparting the desired degree of stability, it is contemplated that the alkali metals will be used in significantly lower concentrations. After addition of the soluble salt, the noble metal component may also be composited in any suitable manner on the support, one particularly convenient method involving the use of an impregnating solution of a water-soluble compound, a specific example being chloroplatinic acid. The impregnated carrier is then dried at a temperature in the range of from about 40° C. to about 150° C. and thereafter subjected to a calcination treatment at an elevated temperature ranging from about 425° to about 600° C. for a period of time sufficient to remove the aqueous portion of the solution. Some specific catalytic compositions of matter which may be used to effect the aromatization of the non-geminally substituted cycloalkane will include platinum composited on a lithiated alumina support, palladium composited on a lithiated alumina support, platinum composited on a potassiated alumina support, palladium composited on a potassiated alumina support, etc. The conditions under which the aromatization will be effected will include temperatures in the range of from about 400° C. to about 550° C., the preferable temperatures lying in an intermediate range of from about 450° to about 500° C. In addition, the pressure at which the aromatization is effected will lie in a range of from about atmospheric up to about 2,000 pounds per square inch and preferably in a range of from about 50 pounds per square inch to about 500 pounds per square inch. The superatmospheric pressure is maintained in the reaction zone by the addition of hydrogen and preferably a hydrogen recycle in such an amount so that the mole ratio of hydrogen to non-geminally substituted cycloalkane charge is in a range of from about 1:1 to about 20:1 and preferably in a range of from about 2:1 to about 8:1 moles of hydrogen per mole of charge.

The process of this invention may be effected in any suitable manner and may comprise either a batch or continuous type operation. For example, when a batch type operation is used a quantity of the geminally substituted cycloalkane is charged to a reaction vessel which, in the preferred embodiment of this process, comprises an autoclave of the rotating or mixing type. The autoclave will contain a catalytic amount of the gold-containing catalyst such as gold composited on $\gamma$-alumina. The apparatus is sealed and the desired operating pressure is attained by charging a substantially inert gas such as nitrogen into the vessel, this gas also containing a predetermined amount of hydrogen which contributes a partial pressure and is added to prevent carbonization of the catalytic composite. Following this the apparatus is heated to the desired operating temperature which is in a range of from about 250° to about 400° C. After subjecting the geminally substituted cycloalkane to these conversion conditions for a period of time ranging from about 0.5 up to about 10 hours or more in duration, heating is discontinued. After the reaction vessel and contents thereof have returned to room temperature the excess pressure is discharged, the autoclave is opened and the reaction mixture is recovered. After separation of the reaction mixture from the catalyst by conventional means such as filtration, the mixture is then subjected to purification and separation means which are well known in the art such as extraction, washing, drying, fractional crystallization, fractional distillation under reduced pressure, etc. whereby the non-geminally substituted cycloalkanes are recovered.

The aforementioned non-geminally substituted cycloalkanes are then charged to a second reactor which contains the catalyst comprising a noble metal of Group VIII of the Periodic Table composited on a promoted solid support. In addition to charging the non-geminally substituted cycloalkane, hydrogen is also introduced with the charge in a mole ratio within the range hereinbefore set forth. The reactor is maintained at the desired operating temperature and pressure of about 450° to 500° C. and at a pressure of about 50 to 500 pounds per square inch. At the end of this time the reaction mixture is recovered and treated in a manner similar to that set forth in the above paragraph whereby the desired substituted aromatic compounds containing the same number of carbon atoms as the starting material are separated from unreacted non-geminally substituted cycloalkanes and recovered.

Another method of effecting the process of this invention is in a continual manner. When such a type of operation is utilized, the geminally substituted cycloalkane is continuously charged to a reaction vessel which contains the desired gold-containing catalytic composition of matter and which is maintained at the proper operating conditions of temperature and pressure, said pressure being partially provided for by the introduction of hydrogen, the remainder of the desired operating pressure being afforded by the presence of a second gas such as nitrogen, carbon dioxide, helium, etc. After a predetermined residence time has elapsed, the reactor effluent is continuously withdrawn and subjected to conventional means of separation whereby the non-geminally substituted cycloalkanes are separated from the unreacted geminally substituted cycloalkanes, the latter being recycled to form a portion of the feed stock while the former are continuously charged to a second reactor which contains the catalyst composite comprising a noble metal of Group VIII of the Periodic Table composited on a promoted solid support. This second reactor is also maintained at the proper operating conditions of temperature and pressure, said pressure, as in the first reactor, being partially provided for by the introduction of hydrogen into the reaction vessel. After a predetermined residence time in the second reactor has elapsed the effluent is continuously withdrawn and subjected to conventional means of separation whereby the desired product comprising a substituted aromatic compound containing the same number of carbon atoms as the starting material is withdrawn and recovered while any non-geminally substituted cycloalkanes which may be present in the effluent are recycled to form a portion of the feed stock.

Due to the physical nature of the two catalysts, especially when composited on a solid support, it is possible to effect the continuous type of operation in various ways. For example, it is possible to effect a continuous type of operation utilizing the two catalysts as fixed beds in the two reactors. The geminally substituted cycloalkane will then be passed over a fixed bed of the catalyst composite in the first reactor in either an upward or downward flow and will be treated in a similar manner by passage over the catalyst in the second reactor. It is also contemplated that the process may be effected by employing the catalysts in a moving bed type of operation. When utilizing this type of operation both catalysts in the two reactors pass through the reactors in either an upward or downward manner while the reactants pass through the two reactors either concurrently or countercurrently to the moving beds of catalyst.

Yet another type of operation which may be employed comprises the slurry type of operation in which the two catalytic compositions of matter are carried into the first and second reactors as a slurry in the charge stock.

Some specific examples of substituted aromatic compounds which may be prepared according to the process of this invention will include o-xylene, ethylbenzene, 1,2-diethylbenzene, isobutylbenzene, ethylnaphthalene, 1,2-dimethylnaphthalene, 3-chloro-o-xylene, 3-chloro-o-ethylbenzene, 3-bromo-o-xylene, 3-bromo-o-ethylbenzene, 3-ethyltoluene, hemimellitene, pseudocumene, 1,2,3-trimethylnaphthalene, 3-methylethylnaphthalene, etc.

The following examples are given to illustrate the process of the present invention which, however, are not intended to limit the generally broad scope of the present invention in strict accordance therewith.

EXAMPLE I

In this example 2 cc. of a catalytic composition of matter which is prepared by compositing a sufficient amount of an aqueous solution of auric chloride and sodium chloride on γ-alumina so that the finished product will contain 1% of gold and 1% of sodium by weight is placed in the glass liner of a rotating autoclave along with 56 g. (0.5 mole) of 1,1-dimethylcyclohexane. The liner is sealed into the autoclave and a sufficient amount of a 1:1 mixture of hydrogen and nitrogen is pressed in until an initial pressure of 500 pounds per square inch is reached. The autoclave and contents thereof are then heated to a temperature of 250° C. and maintained thereat for a period of 6 hours. At the end of this time heating is discontinued, the autoclave is allowed to return to room temperature and the excess pressure is discharged. The reaction mixture, after opening the autoclave, is recovered and separated from the catalyst by means of filtration. This reaction mixture is then subjected to fractional distillation under reduced pressure and the non-geminally substituted cycloalkanes comprising 1,2-dimethylcyclohexane and ethylcyclohexane are recovered.

An aromatizing catalyst is prepared by impregnating γ-alumina with a sufficient amount of chloroplatinic acid and lithium nitrate to yield a finished catalyst, after drying and calcination, which will contain 0.75% by weight of platinum and 0.33% by weight of lithium. The catalyst, in an amount of 2 cc., is placed in the glass liner of a rotating autoclave and the non-geminally substituted cycloalkanes which are prepared according to the above paragraph are charged thereto along with a sufficient amount of hydrogen so that the mole ratio of hydrogen to hydrocarbon charge is 2:1. The autoclave is then heated to a temperature of 450° C. and maintained thereat for an additional period of 6 hours. At the end of this time heating is discontinued and the autoclave is allowed to return to room temperature. The excess pressure is discharged and the reaction mixture is recovered therefrom. After removal of the catalyst by filtration, the mixture is extracted, the solvent is evaporated and the product is subjected to fractional distillation under reduced pressure whereby the desired products comprising ethylbenzene and o-xylene are separated and recovered.

EXAMPLE II

In this example 2 cc. of a catalyst which comprises gold composited on silica in an amount sufficient so that the finished catalyst, after drying and calcination thereof contains 1.5% by weight of gold and 1% by weight of sodium is placed in the glass liner of a rotating autoclave. In addition, the autoclave will also contain 70 g. (0.5 mole) of 1,1-diethylcyclohexane. After sealing the liner into the autoclave the latter is pressured to an initial operating pressure of 500 pounds per square inch by means of a 1:1 mixture of hydrogen and nitrogen. The autoclave is then heated to a temperature of 250° C. and maintained thereat for a period of 6 hours. At the end of this time heating is discontinued, the autoclave is allowed to return to room temperature and the final pressure which is in excess of 500 pounds per square inch at room temperature is discharged. The autoclave is opened and the mixture is recovered therefrom. After separation from the catalyst by filtration, the mixture is subjected to fractional distillation whereby the desired non-geminally substituted cycloalkanes comprising isobutylcyclohexane and 1,2-diethylcyclohexane are recovered.

The non-geminally substituted cycloalkanes which are prepared according to the above paragraph are placed in a second autoclave along with a catalytic amount of an aromatization catalyst comprising 0.75% by weight of palladium and 0.33% by weight of potassium composited on a γ-alumina support. The cyclohexanes are charged to the autoclave along with hydrogen so that a mole ratio of 4:1 moles of hydrogen per mole of charge is maintained. The autoclave is then heated to a temperature of 500° C. and maintained thereat for a period of 4 hours. At the end of this time heating is discontinued, the excess pressure is discharged after the autoclave has returned to room temperature and the reaction mixture is recovered. The reaction mixture is treated in a manner similar to that set forth in Example I above whereby the desired products comprising isobutylbenzene and 1,2-diethylbenzene are recovered.

EXAMPLE III

To an autoclave containing a catalyst comprising 0.8% by weight of gold and 1% by weight of potassium composited on γ-alumina is charged 83 g. (0.5 mole) of 1,1-dimethyldecahydronaphthalene. The autoclave is sealed and a sufficient amount of a gaseous mixture containing a 1:1 mole ratio of hydrogen and nitrogen is pressed in until an initial pressure of 500 pounds per square inch is reached. The autoclave is then heated to a temperature of 550° C. and maintained thereat for a period of 4 hours. At the end of this time heating is discontinued, the autoclave is allowed to return to room temperature and the excess pressure is discharged. The autoclave is opened, the reaction product is separated from the catalyst and subjected to fractional distillation whereby the non-geminally substituted decahydronaphthalenes comprising ethyldecahydronaphthalene and 1,2-diethyldecahydronaphthalene are recovered.

The non-geminally substituted decahydronaphthalenes are treated in a manner similar to that set forth in the above examples by being aromatized at a temperature of 500° C. for a period of 4 hours in the presence of a catalyst comprising 0.75% by weight of platinum and 0.33% by weight of lithium composited on γ-alumina. After recovery of the reaction mixture from the reactor and subjecting said mixture to fractional distillation under reduced pressure, the desired products comprising ethylnaphthalene and 1,2-dimethylnaphthalene are recovered.

I claim as my invention:

1. A process for the conversion of a geminally substituted cycloalkane which comprises isomerizing said cycloalkane at a temperature in the range of from about 250° to about 400° C. and a pressure in the range of from about atmospheric to about 1,000 pounds per square inch in the presence of a gold-containing catalyst, thereafter aromatizing the resultant non-geminally substituted cycloalkane at a temperature in the range of from about 400° to about 550° C. and a pressure in the range of from about atmospheric to about 2,000 pounds per square inch in the presence of an aromatization catalyst comprising a noble metal of Group VIII of the Periodic Table composited on a promoted solid support, and recovering the resultant substituted aromatic compounds.

2. The process as set forth in claim 1 in which said gold-containing catalyst contains an alkali or alkaline earth metal.

3. The process as set forth in claim 1 in which said gold-containing catalyst comprises gold composited on silica.

4. The process as set forth in claim 1 in which said gold-containing catalyst comprises gold composited on alumina.

5. The process as set forth in claim 1 in which said aromatization catalyst comprises platinum composited on lithiated alumina.

6. The process as set forth in claim 1 in which said aromatization catalyst comprises palladium composited on lithiated alumina.

7. The process as set forth in claim 1 in which said geminally substituted cycloalkane is 1,1-dimethylcyclohexane and said substituted aromatic compounds are ethylbenzene and o-xylene.

8. The process as set forth in claim 1 in which said geminally substituted cycloalkane is 1,1-diethylcyclohexane and said substituted aromatic compounds are isobutylbenzene and 1,2-diethylbenzene.

9. The process as set forth in claim 1 in which said geminally substituted cycloalkane is 1,1-dimethylnaphthalene and said substituted aromatic compounds are ethylnaphthalene and 1,2-dimethylnaphthalene.

References Cited

UNITED STATES PATENTS

| | | | |
|---|---|---|---|
| 3,156,735 | 11/1964 | Armstrong | 260—668 D |
| 3,190,932 | 6/1965 | Johnson | 260—668 D |

FOREIGN PATENTS

| | | |
|---|---|---|
| 1,032,754 | 6/1966 | Great Britain. |

OTHER REFERENCES

Erkelens et al., Trans. Faraday Soc., 59, 1181–91 (1963); Abs. at Chem. Abs. 59, 5820, Sept. 16, 1963.

Alchudzhan et al., Izv. Akad. Nauk Arm. SSR, Khim Nauki 17 (4), 368–74 (1964); Abs. at Chem. Abs. 61, 15985, Dec. 21, 1964.

Chambers et al., Journal of Catalysis 5, 517–28 (1966).

CURTIS R. DAVIS, Primary Examiner

U.S. Cl. X.R.

260—668 D